United States Patent

[11] 3,595,397

| [72] | Inventor | Ralph L. Abos<br>Whittier, Calif. |
|---|---|---|
| [21] | Appl. No. | 827,340 |
| [22] | Filed | May 23, 1969 |
| [45] | Patented | July 27, 1971 |
| [73] | Assignee | Anti-Pollution Devices, Inc.<br>Industry, Calif. |

[54] FILTER APPARATUS
8 Claims, 4 Drawing Figs.

[52] U.S. Cl............................................ 210/232,
210/266, 210/282, 210/284, 210/346
[51] Int. Cl......................................................B01d 27/02,
B01d 27/08
[50] Field of Search............................................ 210/137,
266, 282, 283, 284, 314, 315, 317, 346, 232, 234, 235

[56] References Cited
UNITED STATES PATENTS

| 1,646,377 | 10/1927 | Sweetland et al............. | 210/346 X |
| 2,036,489 | 4/1936 | Murphy......................... | 210/137 X |
| 2,082,322 | 6/1937 | Brundage...................... | 210/266 X |
| 2,103,434 | 12/1937 | Pennebaker................... | 210/284 X |
| 2,143,229 | 1/1939 | Russel .......................... | 210/137 |
| 2,785,803 | 3/1957 | Young........................... | 210/284 X |

*Primary Examiner*—Samih N. Zaharna
*Attorney*—J. Carroll Baisch

ABSTRACT: A disposable water-filtering apparatus having a pressure regulator and shutoff valve, and self-sealing disconnect means.

PATENTED JUL 27 1971
3,595,397
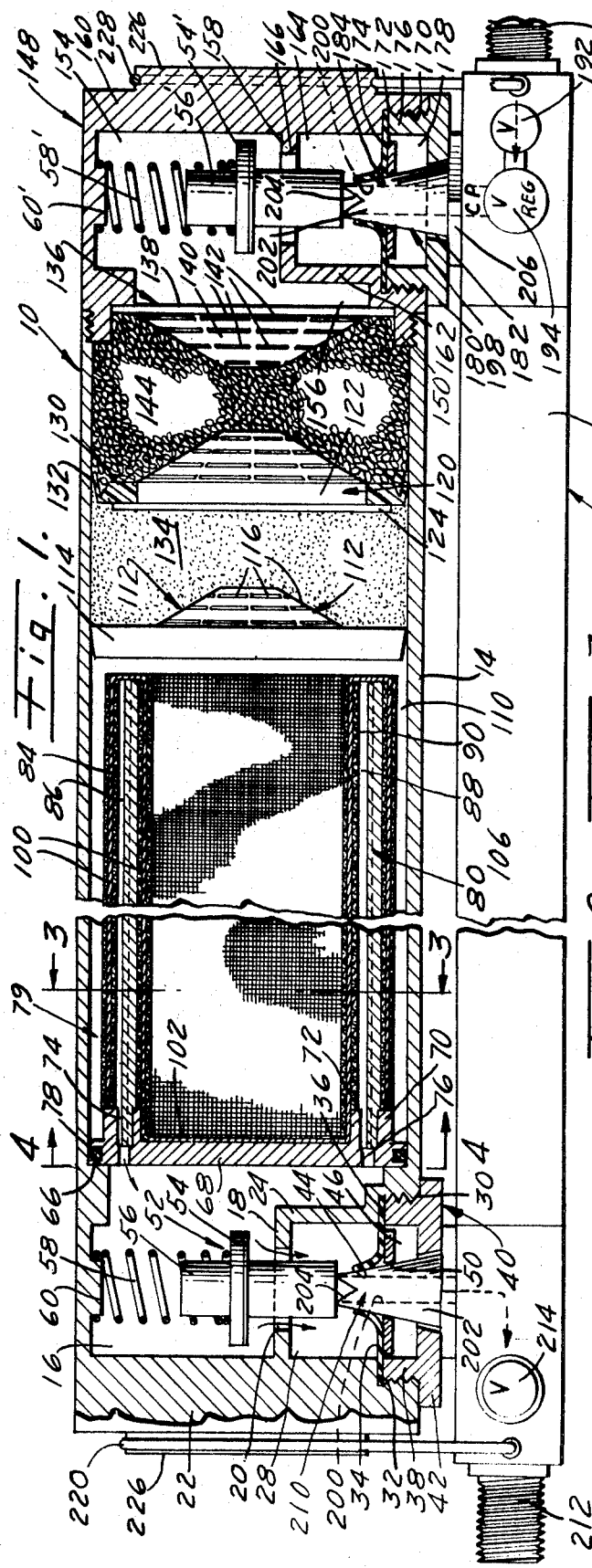
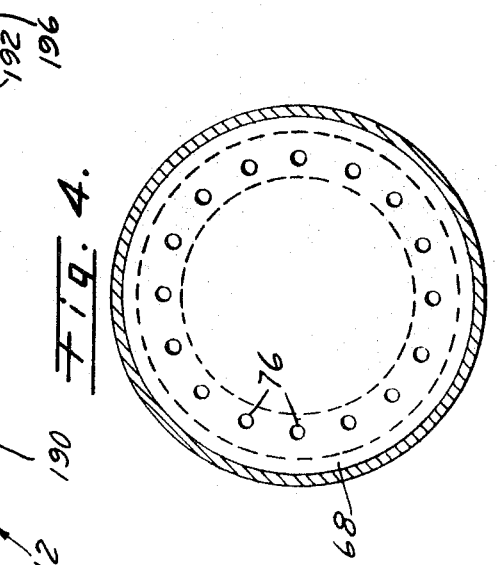
Fig. 4.
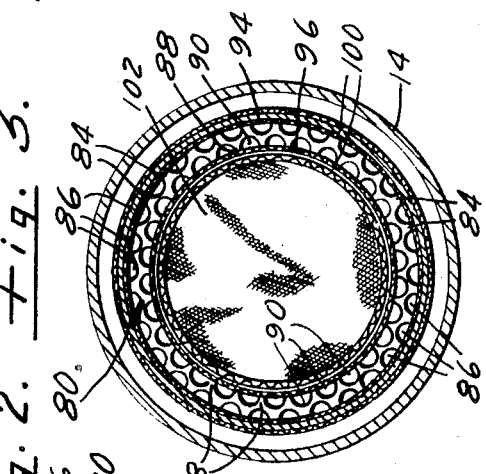
Fig. 3.
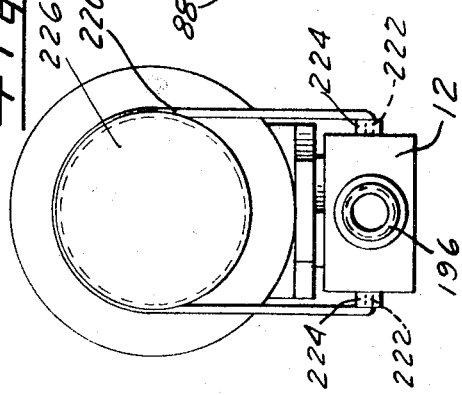
Ralph L. Abos,
INVENTOR.
BY J.C.Baisch
Attorney

FILTER APPARATUS

BACKGROUND OF THE INVENTION

1. Field of the Invention

This invention relates generally to water-filtering apparatus and relates more particularly to institutional filtering apparatus.

2. Description of the Prior Art

There are various types of filters in the prior art for filtering out foreign materials in water but these generally are relatively large in size, and are difficult to install, service, or replace when this is required.

BRIEF SUMMARY OF THE INVENTION

The present apparatus has an outer shell of plastic or other suitable material within which there is a tubular sleeve which is longitudinally corrugated interiorly and exteriorly. A filter cloth is disposed about the sleeve and on the inner side thereof, this filter cloth being held in place by fiber glass screening, both interiorly and exteriorly.

A body of activated carbon and a separated body of diatomaceous earth is contained within the shell upstream of the tubular sleeve, filter cloth, and screening, there being a liquid distributor upstream of the body of activated charcoal, a liquid distributor between the body of activated charcoal, and the body of diatomaceous earth, and a liquid distributor at the downstream side of the body of diatomaceous earth.

Check valves are disposed at the inlet and the outlet of the apparatus in conjunction with connectors for easily and quickly and accurately connecting the apparatus into a water system and easily and quickly disconnecting same, the connectors automatically opening said check valves when the apparatus is installed, said check valves automatically closing when the apparatus is disconnected or removed from the water system.

Pressure control and shutoff means is provided at the inlet end of the apparatus.

ADVANTAGES OF THE INVENTION

An advantage of the invention is that it is relatively inexpensive but highly effective in filtering water.

Another advantage of the invention is that it is relatively small in size but will filter a relatively large amount of water before becoming ineffective as a filter.

Still another advantage of the invention is that it removes taste, odors, turbidity, all suspended foreign matter, and undissolved solids from the water.

A further advantage of the invention is that it provides crystal clear, beverage quality water.

A still further advantage is that because it is inexpensive it is disposable.

The characteristics and advantages of the invention are further sufficiently referred to in connection with the following detailed description of the accompanying drawings which represent one embodiment. After considering this example, skilled persons will understand that many variations may be made without departing from the principles disclosed and I contemplate the employment of any structures, arrangements or modes of operation that are properly within the scope of the appended claims.

Referring to the drawings, which are for illustrative purposes only:

FIG. 1 is a longitudinal sectional view through apparatus embodying the present invention;

FIG. 2 is an end view of the same;

FIG. 3 is a sectional view taken on line 3–3 of FIG. 1; and

FIG. 4 is a sectional view taken on line 4–4 of FIG. 1.

Referring more particularly to the drawings, there is shown a filter assembly, indicated generally at 10, and a support therefor, indicated generally at 12.

The filter assembly comprises a hollow cylindrical housing 14 which has a valve chamber 16 at one end, shown as the discharge end. Within the chamber 16 is a horizontal valve seat 18 having a fluid port 20 therein, said valve seat having one side integral with the adjacent end wall 22 of the housing which thus supports said side of the valve seat, the other side of said valve seat being supported by a vertical wall 24. Wall 22, valve seat 18, and wall 24 define an outlet chamber 28, port 20, when open, providing fluid communication between the valve chamber 16 and the outlet chamber 28.

The lower end of vertical wall 24 is integral with the housing 10 which has a tapped bore 30 aligned with the outlet chamber 28. At the bottom of bore 30 is a shoulder 32 against which a marginal portion of a flexible lip seal diaphragm or gasket 34 is disposed and held in position by the inner annular end 36 of an externally threaded part 38 of a plug, indicated generally at 40. The part 40 is screwed into the tapped bore 30, said plug having a head 42 whereby a tool may be attached to said plug for tightening or loosening same.

The diaphragm or lip seal gasket 34 has a central opening 44 therein for a purpose to be described hereinafter. Plug 40 has a recess 46 therein within which is floatingly disposed a washer 48 of somewhat smaller diameter than that of the recess, said washer having a central or axial opening 50 therethrough.

Within the valve chamber is a check valve, indicated generally at 52, which has a valve disc 54 on a stem 56 which extends axially above and below said disc, the lower portion of said stem 56 being of smaller diameter than the port 20 and extends therethrough. There is a spring 58 which reacts between the valve disc 54 and the adjacent wall part of the housing, said spring being held in position by the stem portion above the disc 54 and a spring retainer 60 formed integral with the adjacent part of the housing. The valve disc 54 is provided with a seal 62 on the under side to seat on the upper side of the valve seat 18 about the port 20.

Upstream of the valve chamber 16 there is an internal shoulder 66 against which a plate 68 abuts, said plate having a pair of radially spaced, annular flanges 70 and 72 extending upstream to define an annular groove 74 from the bottom of which a plurality of annularly spaced passages 76 extend through the plate thereby connecting the groove 74 with the valve chamber 16. Plate 68 has a peripheral groove therein in which is disposed a seal 78 which may be of any suitable character such as an O-ring, which provides a seal between the periphery of the disc 68 and the inner wall of the housing.

There is a filter unit indicated generally at 79, which comprises a hollow tube or sleeve, indicated generally at 80, which is externally and internally corrugated, there being longitudinally extending, annularly spaced exterior ribs 84 between which are longitudinally extending channels 86. There are similar internal ribs 88 with channels 90 therebetween, the ribs 88 being offset annularly relative to the ribs 84. An end portion of the tube 80 adjacent the disc 68 is disposed in the groove 74 and because of the offsetting of the internal and external ribs relative to each other the channels 86 and 90 communicate with the passages 76.

About the exterior of the sleeve 80 is a tubular screen 94 and there is a similar tubular screen 96 on the interior of said sleeve 80. The screens may be of fiber glass or other suitable material and the mesh may be that of ordinary screening or other suitable mesh. The ends of the screens adjacent the disc 68 rest on the free ends of the flanges 70 and 72 while the opposite ends of the screens terminate at the free end of the sleeve 80.

There is a filtering sleeve 100 of suitable cloth or fabric that is closed at one end, as at 102. Canton flannel has been found to be highly effective and one layer is sufficient. This fabric or cloth is napped on one side and the nap is at the outer or free side.

Filtering sleeve 100 has a portion thereof disposed within the corrugated sleeve with the end 102 lying against the portion of the disc 68 within the flange 72. The portion of the sleeve within the corrugated sleeve is against the inner screen 96. The filtering or fabric screen extends over the free ends of the corrugated sleeve and the adjacent ends of the screens and about the exterior screen 94. The open end of the sleeve extends to the free end of the flange 70 of the disc 68.

Another tubular screen 106 is disposed about the part of the filtering sleeve at the exterior of the corrugated sleeve to secure the filtering sleeve on the corrugated sleeve. A similar tubular screen 108 is within the corrugated sleeve for holding the inner part of the fabric sleeve in place.

It is to be noted that the exterior diameter of the assembly 79 is smaller than the interior diameter of the housing so as to leave an annular space 110 for the flow of fluid.

Upstream of the assembly 79 is a hollow fluid distributor, indicated generally at 112, that has a rim 114 and a generally frustoconical central part which has a plurality of arcuate slots 116 forming a series of interrupted concentric circles which are spaced apart longitudinally of the distributor and being progressively smaller toward the free end. The rim of the distributor is secured to the housing wall by any suitable means. Since the device is disposable, the rim of the distributor is secured to the housing wall by any suitable adhesive on the market such as an epoxy cement.

Another distributor, indicated generally at 120, is spaced from the distributor 112 toward the inlet end of the housing. This distributor has a cylindrical base 122 with a rim 124 at the free end, said rim 124 being of smaller external diameter than the interior diameter of the housing but of greater diameter than the cylindrical base 122. This distributor has a frustoconical central part 126 with arcuate slots 128 similar to the slots 116 of the distributor 112. The frustoconical part 126 faces upstream and there is a flexible sealing element 130 disposed on the base 122 and has annular lip 132 which sealingly engages the wall of the housing 10.

Between the distributors 112 and 120 is a body of diatomaceous earth filter media 134.

Spaced upstream from the distributor 120 is another distributor, indicated generally at 136, having a rim 138 and frustoconical part 140 with slots 142 therein arranged similarly to the slots in the other distributors. Distributors 136 faces downstream. Between distributors 120 and 136 is a body 144 of 10 to 30 micron activated carbon.

The rim 138 of the distributor 136 is of smaller outside diameter than the inside diameter of the housing and said distributor 136 is secured by an inlet assembly, indicated generally at 148, including an externally threaded part 150 screwed into an adjacent internally threaded end portion of the housing. An inwardly extending annular flange 152 provides a shoulder engaging the rim 138 of distributor 136 and holds said distributor in place.

The inlet assembly 148 includes an inlet valve chamber 154 having a large outlet opening 158 defined by the flange 152. There is a horizontal valve seat 158 extending from the outer end wall 160 of the inlet assembly and at its inner end there is a vertical wall 162, said valve seat, wall 162 and part of the end wall 160 defining an inlet chamber 164 which is connected to and communicates with the inlet chamber 154 only by way of an inlet port 166.

Within the inlet valve chamber 154 is a valve 155 identical with the valve 52, the parts of valve 155 being given the same reference numerals as the parts of valve 52 with the addition of a prime. A spring 58' reacts between the valve disc 54' and adjacent part of the exterior wall of the inlet assembly for urging the valve into seating engagement with the valve seat and hence close the port 166. One end portion of the spring 58' is disposed on the upper part of the valve stem 56' while the opposite end is retained in place by a spring retainer 60'.

There is a tapped bore 170 in line with the inlet chamber 164 with a shoulder 172 at the inner end of said bore. A lip seal gasket 174, has a marginal part secured between said shoulder 172 and the inner end of an externally threaded plug 176 screwed into said tapped bore. Plug 176 has a recess 178 therein, said plug having a head 180 for attachment of an actuating tool. Head 180 defines the outer end of recess 178 and has an opening 182 therethrough.

Gasket 174 has a central or axial opening 184 therein and floatingly disposed within recess 178 is a washer 186 having a central or axial opening therein.

The support 12 comprises a central part 190 with a fluid control valve 192 and a pressure regulator 194 in one end. The control valve 192 is connected with the inlet of the pressure regulator 194 which is of the constant outlet pressure type of regulator. An example of such a pressure regulator is one of those of the Norgren Manufacturing Co. of Denver, Col. The support is provided with an externally threaded fitting 196 for connection with a source of water under pressure. Fitting 196 also has a fluid connection with the valve 192 and the pressure regulator 194 has a fluid connection with an inlet fitting, indicated generally at 198, that has a fluid passage 200 therethrough.

Fitting 198 has a tapered, generally conical connector part 202. The free end of said connector part 202 is notched as at 204 to provide fluid communication between the passage 184 and the inlet chamber 164. Fitting 198 has a head 206 for attachment of tool for tightening the fitting and loosening same. The fitting also has an externally threaded part, now shown, screwed into a tapped bore, now shown, in the support. The passage 200 through the fitting 198 is connected with the outlet of the pressure regulator valve 194.

At the outlet end of the support 12 there is a fitting 210 that is identical with the fitting 198 and the respective parts thereof are given the same reference numerals. The passage 200 of the fitting 210 is connected to an externally threaded outlet fitting 212 adapted to be connected to an apparatus, appliance, or device to be supplied with filtered water.

A bleed valve 214 is connected with the passage from the passage 200 of the fitting 210 to the outlet fitting 212, and may be connected to a disposal point by a conduit, not shown. This is an ordinary well-known type of valve which is normally closed but which may be opened to bleed the system as when a new filter assembly is installed. Normally the valves 52 and 155 are closed by the springs 58 and 58'. When installing the filter assembly it is placed onto the fittings 198 and 210, said fittings then projecting through the openings in the heads 206 of the plugs 38 and 176. The tapered parts 202 of said fittings extend through the inlet and outlet chambers 164 and 28, through the central openings in the washers in said chambers 164 and 28 and through the central or axial openings in the inlet and outlet gaskets 186 and 34 respectively. The areas about the central or axial openings in said gaskets sealingly engage the tapered parts 202 of the fittings 198 and 210. The holes or openings in the washers are of such size that the tapered parts 202 pick the washers up and position them behind the gaskets to prevent said gaskets from being forced inwardly into the recesses 178 and 46 and possibly permit water to pass into said recesses.

When the filter assembly is placed fully onto the fittings 198 and 210 the inner ends of said fittings engage the adjacent ends of the valve stems 56 and 56' and force the valve to the open position, as shown in FIG. 1.

The filter assembly is secured onto the support 12 by means of a bail at each end. Each bail comprises a loop 220 with free end portions 222 turned laterally toward each other. The inturned end portions 222 are rotatably disposed in recesses provided therefor in bosses 224 on the support adjacent the ends thereof.

The end walls 22 and 160 of the filter assembly each has an external, relatively large diameter boss 226 with a peripheral groove 228 therein. The closed end of each bail is slipped into the groove of the respective boss 226, the bail being swingable into the fastening position and when it is desired to remove the filter assembly the bails are pulled out of the grooves and swung away from the respective ends of the filter assembly.

When the filter assembly is removed from the support the valves 52 and 52' are immediately closed by their respective springs 58 and 58' so water in the housing will not run out and make a messy spill over things.

Water to be filtered enters through the fitting 196 and flows through the valve 192, which is normally open when the apparatus is in operation. From the valve 192 the water flows through the pressure regulator, into the passage 200 of the fitting 198, out through the V-shaped notch 204, into the inlet chamber 164, through the port 166 and into the inlet chamber 154, thence through the opening 156 and through the slots of the distributor 136. The distributed water then flows through the body 144 of activated carbon, through the slots of the distributor 120 through the diatomaceous earth 134, the slots of the distributor 112 and into that part of the housing in which the filter unit 79 is disposed.

The water then passes through the canton flannel, into the longitudinally extending grooves 86 and 88 of the corrugated sleeve 80, thence through the passages 76 in the disc 68, into the outlet chamber 16, through the port 20 and outlet chamber 28. From chamber 28 the water flows through the V-shaped notch in the fitting 210, through the passage 200 thereof and into the fitting 210. The filtered water then is carried by suitable conduit means to any location desired.

The water in the filter is under pressure at all times and when it is desired to remove the filter assembly the valve 192 is closed. With this arrangement the pressure regulator adjustment remains the same and does not have to be reset or adjusted upon reopening of the valve 192 after the filter has been changed.

When a new filter has been installed the water flowing therethrough picks up some of the diatomaceous earth and deposits it on the napped surface of the canton flannel so the latter gives added filtering effectiveness. The screens on the outer sides of the flannel prevents the diatomaceous coating from falling off the flannel.

In operation the charcoal takes out undesirable tastes and odors while the diatomaceous earth takes out turbidity, all suspended foreign matter, and undissolved solids. The filtered water is crystal clear and of high quality. The combination of activated carbon and diatomaceous earth has been found to give highly effective and unexpected results.

I claim:

1. Fluid-filtering apparatus, comprising an assembly including:
   A. an elongated tubular housing having an inlet end and an outlet end with an inlet and an outlet respectively;
   B. a filter unit mounted in said housing adjacent the outlet end, said filter unit comprising
      a. a hollow tubular sleeve having longitudinally extending fluid channels in at least one side, said channels discharging at the downstream end of the tubular sleeve,
      b. filtering fabric secured over the channeled side of the tubular sleeve;
   C. a body of diatomaceous earth and a separate body of activated carbon within said housing and retainer
   D. means for retaining said body of diatomaceous earth and body of activated carbon in the housing upstream of the filtering unit, said retainer means having openings therein for the flow of fluid therethrough;
   E. the tubular sleeve being corrugated on the outer side and on the inner side, said corrugations providing exterior and interior longitudinally extending fluid channels connected with the outlet; the filtering fabric being on the exterior of the tubular sleeve and on the interior thereof and secured to the interior and exterior of said tubular sleeve.

2. The invention defined by claim 1, wherein the filtering fabric comprises canton flannel napped on the outer side, said fabric being secured to the tubular sleeve by screening material.

3. The invention defined by claim 1, wherein the respective channels on the interior and exterior of the sleeve are annularly offset relative to each other.

4. The invention defined by claim 1, wherein the filtering fabric is secured to the corrugated sleeve by screening, and wherein there is at least one layer of screening between the fabric and the adjacent sides of said tubular sleeve to thereby hold the fabric from entering the channels.

5. Fluid filtering apparatus, comprising an assembly including:
   A. an elongated tubular housing having an inlet end and an outlet end with an inlet and an outlet, respectively;
   B. a filter unit mounted in said housing adjacent the outlet end, said filter unit comprising
      a. a hollow tubular sleeve having longitudinally extending fluid channels in at least one side, said channels discharging at the downstream end of the tubular sleeve,
      b. filtering fabric secured over the channeled side of the tubular sleeve;
   C. a body of diatomaceous earth and a separate body of activated carbon within said housing and retainer
   D. means for retaining said body of diatomaceous earth and said body of activated carbon in the housing upstream of the filtering unit, said retainer means having openings therein for the flow of fluid therethrough;
   E. A normally closed inlet valve and a normally closed outlet valve, said valves each having a valve stem, a support for the filter assembly, said support having an inlet and an outlet, an inlet and an outlet tapered fitting positioned for reception in the inlet and outlet, respectively, of the tubular housing, said tapered fittings extending into the inlet and outlet, respectively, and engaging said valve stems for moving the valves in the opening direction when the filter assembly is moved onto said fittings;
   F. and means for securing said filter assembly on said support.

6. The invention defined by claim 5, including a gasket secured respectively at the inlet and outlet, said gaskets having central openings therein through which the tapered fittings extend, said gaskets sealingly engage the tapered fittings.

7. The invention defined by claim 6, including washers having central openings therethrough in alignment with the openings in the gaskets, the openings in the washers being of approximately the diameter of an intermediate part of the fittings for engagement with such intermediate parts so as to be supported beneath the respective gaskets.

8. The invention defined by claim 5, wherein the tapered fittings have fluid passage means at their free ends, said free ends being the parts of said fittings which engage the valve stems for moving the valves to the open position when the filter assembly is attached to said tapered fittings.